United States Patent
Houser et al.

(10) Patent No.: US 9,832,545 B2
(45) Date of Patent: Nov. 28, 2017

(54) SYSTEM AND METHOD FOR PROVIDING A DISTRIBUTED DIRECTIONAL APERTURE

(71) Applicant: Northrop Grumman Systems Corporation, Falls Church, VA (US)

(72) Inventors: Peter B. Houser, Poway, CA (US); Suzanna J. LaMar, San Diego, CA (US); Bayne R. Bunce, San Diego, CA (US); Jinous Valizadeh, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 362 days.

(21) Appl. No.: 14/511,962

(22) Filed: Oct. 10, 2014

(65) Prior Publication Data

US 2015/0102942 A1   Apr. 16, 2015

Related U.S. Application Data

(60) Provisional application No. 61/889,860, filed on Oct. 11, 2013.

(51) Int. Cl.
| | |
|---|---|
| *G01S 13/88* | (2006.01) |
| *H04Q 9/00* | (2006.01) |
| *G01S 13/44* | (2006.01) |
| *G01S 13/48* | (2006.01) |

(52) U.S. Cl.
CPC ........... *H04Q 9/00* (2013.01); *G01S 13/4463* (2013.01); *G01S 13/48* (2013.01); *H04Q 2209/40* (2013.01)

(58) Field of Classification Search
CPC .............................. G01S 13/4463; G01S 13/48
USPC .......................................... 342/153–155, 175
See application file for complete search history.

(56) References Cited

U.S. PATENT DOCUMENTS

| | | | | |
|---|---|---|---|---|
| 3,835,469 A | * | 9/1974 | Chen ...................... | H01Q 15/02 342/376 |
| 4,688,045 A | * | 8/1987 | Knudsen .............. | H01Q 3/2682 342/375 |
| 5,353,033 A | * | 10/1994 | Newberg ............. | H01Q 3/2676 342/154 |
| 6,211,808 B1 | * | 4/2001 | Rees ........................ | G01S 7/04 342/27 |

(Continued)

*Primary Examiner* — Marcus Windrich
(74) *Attorney, Agent, or Firm* — Sean S. Wooden; Andrews Kurth Kenyon LLP (57) ABSTRACT

A distributed directional aperture (DDA) system provides the capability to receive and/or transmit signals, limiting that reception or transmission to a 3-dimensional beam. The DDA system includes sensing and/or emitting array subsystems which comprise sensors and/or emitters distributed across, within, or under the skin of an aircraft, ship, ground vehicle, or fixed installation. The sensors receive energy, convert the received signals to digital information, and transmit that information via a telemetry subsystem to a beamformer subsystem. The beamformer subsystem analyzes the received signals from the sensors and/or emitters in order to determine the signal content from a specific direction. The emitters transmit energy, converting signals received from the beamformer subsystem via the telemetry subsystem into energy emissions. Methods of providing the DDA system including subsystems thereof are also disclosed.

34 Claims, 8 Drawing Sheets

(56) References Cited

U.S. PATENT DOCUMENTS

| | | | | |
|---|---|---|---|---|
| 6,693,590 B1* | 2/2004 | Toplicar | ............... | H01Q 3/26 342/372 |
| 7,876,263 B2* | 1/2011 | Quan | ............... | H01Q 21/0025 342/154 |
| 8,570,210 B1* | 10/2013 | Fonder | ............... | G01S 13/02 342/25 B |
| 9,128,189 B1* | 9/2015 | West | ............... | G01S 13/93 |
| 2003/0164791 A1* | 9/2003 | Shinoda | ............... | G01S 13/4463 342/70 |
| 2006/0220956 A1* | 10/2006 | Richardson | ............... | G01S 7/2813 342/375 |
| 2009/0267822 A1* | 10/2009 | Shinoda | ............... | G01S 7/352 342/70 |
| 2010/0204867 A1* | 8/2010 | Longstaff | ............... | G01S 13/003 701/26 |
| 2010/0214171 A1* | 8/2010 | Quan | ............... | H01Q 1/28 342/374 |
| 2011/0160941 A1* | 6/2011 | Garrec | ............... | G01S 13/913 701/17 |
| 2011/0221625 A1* | 9/2011 | Cornic | ............... | G01S 13/424 342/29 |
| 2011/0248796 A1* | 10/2011 | Pozgay | ............... | G01S 13/4463 333/137 |
| 2011/0248881 A1* | 10/2011 | Kemkemian | ............... | G01S 13/003 342/156 |
| 2011/0298653 A1* | 12/2011 | Mizutani | ............... | G01S 13/48 342/147 |
| 2013/0214972 A1* | 8/2013 | Woodell | ............... | H01Q 1/281 342/372 |
| 2014/0035781 A1* | 2/2014 | Holzheimer | ............... | G01S 3/50 342/188 |

\* cited by examiner

SYSTEM AND METHOD FOR PROVIDING A DISTRIBUTED DIRECTIONAL APERTURE

RELATED APPLICATIONS

This application claims the priority of U.S. Provisional Application Ser. No. 61/889,860 filed Oct. 11, 2013, the entirety of which is hereby incorporated by reference.

BACKGROUND

Embodiments described herein relate to devices that receive and transmit energy. Such devices are commonly known as "antennas" or "apertures". Such apertures are commonly known to operate on various forms of energy, including Radio Frequency (RF) energy and acoustic energy, most commonly spanning radiated frequencies from $10^{11}$ Hz to $10^1$ Hz. Embodiments described herein relate to apertures that are tuned to any of those forms of energy and frequencies. Aperture usage is commonly known on many entities, including air vehicles, maritime vehicles, ground vehicles, fixed ground structures, and fixed maritime structures. Embodiments described herein relate to apertures that are associated with any of those entities.

Apertures are commonly known to be used to receive and transmit energy for various purposes, including cooperative communications, uncooperative signal intercept, uncooperative signal interference, and positional sensing. Embodiments described herein relate to apertures that are used for any of those purposes. Most current apertures are dedicated to a single one of those purposes, while embodiments allow an aperture to be easily used for more than one purpose simultaneously.

Apertures are commonly known to encompass systems that consist of a single sensing or emission element and provide substantially omnidirectional performance. Apertures are also commonly known to encompass systems that consist of many elements and are collectively used to transmit or receive energy in a restricted direction, thereby increasing the quality of the reception or transmission. The techniques for restricting energy sensing or emission to a limited direction are commonly known as beamforming. Due to processing and data transfer speed limitations such directional apertures have in the past been limited to lower frequency signals, nominally $10^3$ Hz, such as those used for acoustic energy processing.

Most commonly-used apertures consist of a single antenna that receives and transmits signals omnidirectionally. Each such aperture is dedicated to a single, unalterable purpose, is connected to a specific electronic system, and is sensitive to a limited range of signal characteristics. As a result of these "stovepipes", many entities are burdened with an excess number of apertures. The excess number of apertures, and the corresponding stovepiped telemetry, has a negative effect on the platform's structure, aerodynamics, and radar observability. In addition, the omnidirectional aperture reception characteristics limit received signal quality, while the omnidirectional transmission characteristics may provide an opportunity for interception by an adversary.

SUMMARY

Embodiments described herein overcome the disadvantages of the prior art. For example, embodiments described herein relate to apertures that alleviate the "stovepipe" limitations. Moreover, described herein provide an aperture that is distributed across, within, or under the skin of an entity (the entity is the platform on which the embodiment is installed (e.g., airplane, helicopter, drone, ship, vehicle, fixed installation, etc.), thereby minimizing the effects of the aperture on the entity's structural, aerodynamic, or radar observability characteristics. Likewise, embodiments described herein also provide a beamforming capability that directionally restricts reception and transmission through the aperture, thereby improving reception and transmission signal quality, and also reducing the risk of signal interception or signal interference. Embodiments described herein also provide information reception and transmission capabilities from a single aperture that may be shared amongst various purposes, including cooperative communications, uncooperative signal intercept, uncooperative signal interference, and sensing. This capability encompasses the ability of providing reception and transmission capabilities across wide bands of energy spectrum, such as within the 30 MHz to 30 GHz band that is commonly used for RF communications.

Embodiments described herein provide these and other advantages with a system for receiving and emitting radiated frequency signals. The system includes a distributed directional aperture system that includes a sensor and emitter array subsystem that includes a plurality of sensors and emitters arranged in an array distributed across a defined area of an exterior surface of at least one entity, in which the sensors sense energy in a media adjacent the at least one entity exterior surface and generate sensor signals and the emitters emit signals based on processing of the sensor signals by the system, a telemetry subsystem that connects the array of distributed sensors and emitters and conveys sensor signals and emitter signals received from or sent to the sensor and emitter array subsystem, and a beamformer subsystem that processes the sensor signals and emitter signals to synthesize directional reception channels and processes transmission channels to synthesize telemetry data that is emitted by the emitters.

BRIEF DESCRIPTION OF THE DRAWINGS

For embodiments of a system and method for providing a distributed directional aperture to be clearly understood and readily practiced, such embodiments are described in conjunction with the following drawings, wherein.

DETAILED DESCRIPTION

It is to be understood that the figures and descriptions of embodiments a system and method for providing a distributed directional aperture described herein may have been simplified to illustrate elements that are relevant for a clear understanding, while eliminating, for purposes of clarity, other elements found in a typical antenna system or antenna method. Those of ordinary skill in the art will recognize that other elements may be desirable and/or required in order to implement the embodiments described herein. However, because such elements are well known in the art, and because they do not facilitate a better understanding of a system and method for providing a distributed directional aperture, a discussion of such elements is not provided herein. It is also to be understood that the drawings included herewith only provide diagrammatic representations of the presently preferred structures of the system and method for providing a distributed directional aperture and that structures falling within the scope of a system and method for providing a distributed directional aperture may include structures different than those shown in the drawings. Reference will now be made to the drawings wherein like structures are provided with like reference designations.

Throughout this disclosure, the term "telemetry" may be interpreted to include monitoring and non-monitoring of critical parameters. For example, raw digitized (e.g., RF) waveform samples may be packetized and transported via an optical interface to, e.g., beamforming computer 470, 570 discussed below with reference to FIGS. 4 and 5.

Objects of embodiments described herein are realized by a distributed directional aperture (DDA) system which provides information reception and transmission capabilities.

The DDA system includes a sensing and emitting array subsystem that is comprised of multiple sensors and emitters. The DDA system includes a telemetry subsystem that is comprised of multiple telemetry connections that collectively interconnect the sensing and emitting array subsystem with the beamformer aubsystem. The DDA system includes a beamformer subsystem that processes receive or transmit data in order to create beams of reception or transmission.

The sensing and emitting array subsystem of multiple sensors and emitters which are installed across, within, or under the external surfaces of an entity. The sensors and emitters may be homogenous, with all having identical configuration and capabilities. Alternatively, the sensors and emitters may be heterogeneous, with varying sensors and emitters that are individually optimized for specific characteristics, and are selected for use based upon the current aperture mission. For example, the sensing and emitting array subsystem may comprise distinct sensing units (sensors) and emitting units (emitters), or it may comprise units having both sensing and emitting capabilities. Individual sensors and emitters may differ in characteristics such as polarization, directional sensitivity, and frequency band sensitivity. The sensors and emitters may be referred to as micro-sensors and micro-emitters. Typically, the sensors and emitters in embodiments may be any size from one quarter inch (¼") in diameter (or other largest dimension) to three inches (3") in diameter (or other largest dimension). Other size emitters or sensors, outside this range may be also used.

An embodiment of the telemetry subsystem is comprised of physical connections between the sensors and emitters and the beamformer subsystem. These physical connections convey information between the sensors and emitters and the beamformer subsystem using a telemetry protocol. The physical connections may be fiber optic, electrical, or wireless, and will support a data rate sufficient to convey the digitized energy samples. The telemetry protocol may be simple and point-to-point or may be bussed using a protocol such as Time Domain Multiple Access (TDMA). The telemetry subsystem may provide connections only within a single local entity or may provide connections spanning sensors and emitters that are distributed across multiple entities that are physically dispersed.

An embodiment of the beamformer subsystem is comprised of processing nodes, interconnect channels, and software, with external connections to the telemetry subsystem, the platform navigation system, and the platform waveform system. The processing nodes and interconnect channels collectively provide a parallel data processing capability that is sufficient to implement beamforming analysis for information reception and transmission. For reception, this beamforming analysis temporally aligns the data received from the sensors through the telemetry subsystem. This temporal alignment is based upon the position and attitude of the platform, computed using the externally-supplied platform data. The beamformer subsystem creates streams of directional received sensor data and routes those streams to the waveform system. For transmission, this beamformer subsystem analysis computes the signals that will be required at each emitter in order to transmit energy in a specific direction and power level. This is based upon the position and attitude of the platform, computed using the externally-supplied platform data. The beamformer subsystem computes the required signals for each emitter, potentially aggregating signals when the emitter will be used for multiple purposes simultaneously. The beamformer subsystem routes the required emission signals to the appropriate emitters through the telemetry subsystem.

These and other objects, features, and advantages of the inventions described herein will be apparent and fully understood from the following detailed description, taken in connection with the appended drawings.

Figure 1:
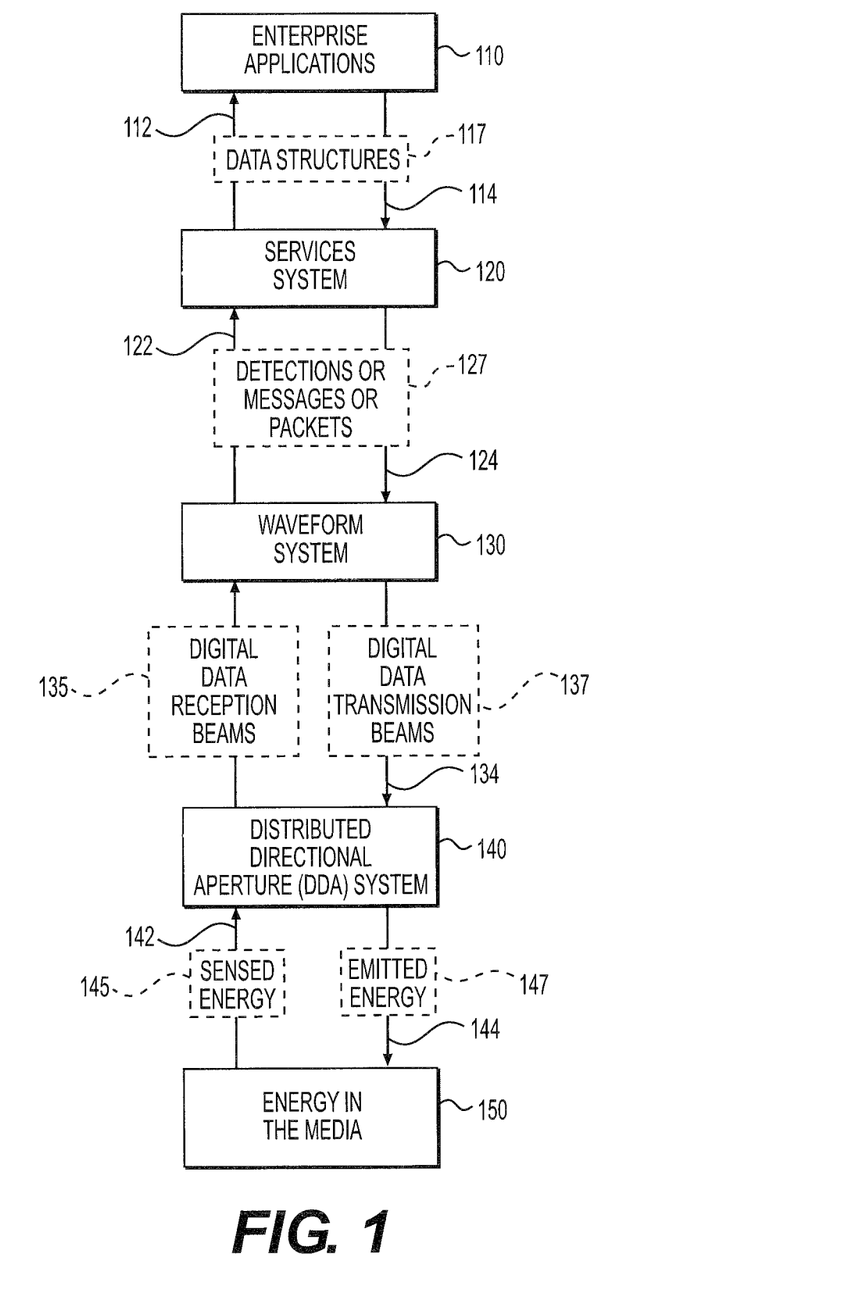
FIG. 1 is a diagram illustrating an exemplary flow of energy and information in an embodiment of a system that includes a distributed directional aperture (DDA) system for sensing or emitting energy.

With reference now to FIG. 1, shown is a flow diagram illustrating an exemplary flow of energy and information in an embodiment of a system 100 that includes a distributed directional aperture (DDA) system 140 for sensing or emitting energy. DDA system 140 exchanges sensed energy 145 or emitted energy 147 using energy in media 150. As used here, the media 150 is the environment surrounding the entity or platform on which system 100 (DDA system 140, related components and subsystems) is installed. For example, the media may be air, space or water. In use, system 100 detects energy in the media (e.g., using sensors) and emits energy into media (e.g., using emitters). The energy may be in the form of signals as described herein. DDA system 140 also transmits 132 digital reception data beams 135 (e.g., at RF rates) to waveform system 130. Sensed energy propagates 142 through media 150 and eventually reaches entity containing DDA system 140 and is received by DDA system 140. The sensed energy signals 145 propogated 142 to DDA system 140 are processed by DDA system 140 in order to create digital reception data beams 135 that ready for analysis by waveform system 130.

Emitted energy 147 is generated by the DDA system and is then emitted 144 outward through media 150. DDA system 140 converts digital transmission data beams 137 that are generated by the waveform system 130 and transmitted 134 to DDA system 140 and then emitted 144 into the media 150.

A key characteristic of an embodiment is that digital reception data beams 135 and digital transmission data beams 137 are digital and convey samples at a rate that fully captures the information of the corresponding sensed or emitted frequency signal (e.g., sensed energy signal 145 or emitted energy signal 147). This implies that the data rate is at least the highest emitted or radiated frequency of interest multiplied by the Nyquist criteria, e.g., a 1 GHz signal in the media 150 will correspond to a 2.5 GHz digital data rate through the data beams 135, 137. It is also possible to pass the digital data beams 135, 137 at lower rates, but to obtain the greatest system capability, and the greatest potential for commonality between different purposes, the data beams 135, 137 will operate at the full Nyquist rate.

Another characteristic of an embodiment that the that digital reception data beams 135 and digital transmission data beams 137 may be connected to existing waveform systems without modification to those waveform systems. The existing waveform systems, such as an AN/ARC-210 radio, are designed for connection to existing omnidirectional antennas. Embodiments of DDS system 140 may be transparently connected to such systems, providing directional inputs to those systems, and thereby improving those systems' performance.

With continued reference to FIG. 1, in embodiments, waveform system 130 comprises well understood systems for communications, electronic intercept, electronic interference, and sensing. These systems may be current, existing systems, including radios such as the AN/ARC-210. In a preferred embodiment, waveform system 130 will be generalized to host any of those services in a common hardware suite. A more general waveform system is best positioned to take advantage of the DDA system 140 capabilities. Waveform system 130 provides 122 received detections or messages or packets 127 to services system 120 based upon digital reception data beams 135. Waveform system 130 accepts or receives 124 messages or packets 127 for transmission from services system 120 and uses that data to generate digital transmission data beams 137.

In a preferred embodiment, waveform system 130 will encompass a very wide range of services, all using DDA system 140 to connect with (e.g., receive and/or sense) energy in the media 150. Waveform system 130 may encompass conventional services such as communications, jamming, intercept, and physical sensing (e.g., radar). Waveform system 130 may also encompass new services that are not possible with current apertures. For example, waveform system 130 may provide an automated aircraft positioning system that would be used in conjunction with a manned or unmanned aircraft. Emitters placed along the landing area could be resolved with very fine resolution by DDA system 140 in azimuth, elevation, and range, providing a far superior system for aircraft precision approach.

With continued reference to FIG. 1, services system 120 provides capabilities such as encryption, decryption, and digital packet routing. Services system 120 exchanges detections, messages or packets 127 with waveform system 130. Services system 120 may be current, existing equipment, such as a KG-250 encryption device. In a preferred embodiment, a common services system 120 will be generalized to host any of the provided services (e.g., encryption, decryption, and digital packet routing) in a common hardware suite. A generalized services system 120 is best positioned to take advantage of DDA system 140 capabilities. Services system 120 transmits 112 reception data structures 117 to and receives 114 transmission data structures 117 from enterprise applications 110.

In an embodiment, enterprise applications system 110 provides system-level capabilities to an end user community. Enterprise applications system 110 exchanges data structures 117 with the services system 120. DDA system 140 will provide greater performance to the communications, electronic intercept, electronic interference, and sensing systems encompassed within the enterprise applications 110, thereby providing greater capability to the user communities that are serviced by the overall capabilities depicted in FIG. 1.

In a preferred embodiment, DDA system 140 services multiple domains within the waveform system 130, the services system 120, and the enterprise applications 110. These domains may include communications, electronic intercept, electronic interference, and sensing. In another preferred embodiment, DDA system 140 services only a single such domain, potentially with replicated DDA systems for individual domains.

Figure 2:
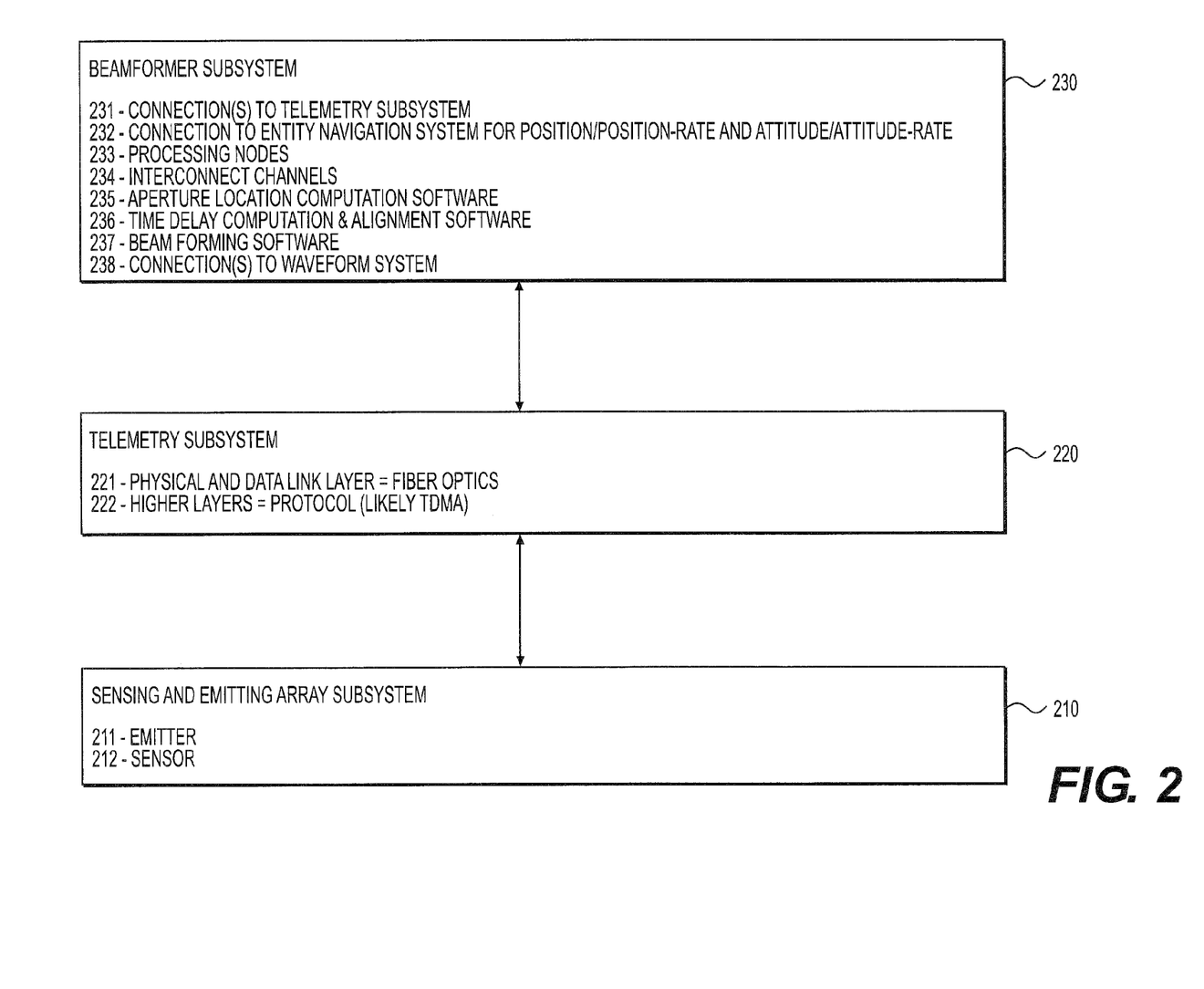
FIG. 2 is a schematic illustrating subsystems of an embodiment of a DDA system.

FIG. 2 is a schematic illustrating subsystems of DDA system 140 shown in FIG. 1. These DDA system 140 subsystems include a sensing and emitting array subsystem 210, a telemetry subsystem 220, and a beamformer subsystem 230. Sensing and emitting array subsystem 210 provides a connection between DDA system 140 and the energy in the media 150. In a preferred embodiment, individual sensing and emitting array subsystem 210 elements may be dedicated to sensing or to emitting. In another preferred embodiment, individual sensing and emitting array subsystem 210 elements may provide both sensing and emitting capabilities. Individual sensors 212 and emitters 211 may also be optimized for performance in specific frequencies, polarities, or other characteristics. The sensing and emitting array subsystem 210 may comprise a homogenous set of sensors 212 and emitters 211 or may comprise a heterogeneous set of sensors 212 and emitters 211. At any given time, an optimized subset of sensors 212 and emitters 211 may then be selected based upon the mission and the characteristics of the intended receive or transmit signals.

Individual sensors 212 and emitters 211 may provide both sensing and emission capabilities, thereby combining the transmission and reception into a single unit. Sensors 212 and emitters 211 that combine multiple capabilities will in general have lesser impact on the entity design than sensors 212 and emitters 211 that are dedicated to more specific capabilities since fewer multi-capability sensors 212 and emitters 211 will be required to provide a desired sampling density. However, single-capability sensors 212 and emitters 211 will be more capable with respect to their single purpose. A preferred embodiment includes both single-capability and multi-capability sensors 212 and emitters 211.

The sensors 212 and emitters 211 may be individually packaged for installation onto the entity. Alternatively, multiple sensors 212 and emitters 211 may be packaged and installed onto the entity as a group. Individually-packaged sensors 212 and emitters 211 will be smaller and more easily accommodated on the entity, while multiply-packaged sensors 212 and emitters 211 will require less telemetry between the elements and the beamformer.

Telemetry subsystem 220 provides a connection between the sensing and emitting array subsystem 210 and the beamformer subsystem 230. The telemetry subsystem 220 includes physical and data link layers 221 between the sensors 212 and emitters 211 and the beamformer subsystem 230. These physical connections 221 convey information between the sensors 212 and emitters 211 and the beamformer subsystem 230 using higher layers 222 that provide a telemetry protocol. The physical connections 221 may be fiber optic, electrical, or wireless, and will support a data rate sufficient to convey the digitized energy samples. The telemetry protocol may be simple and point-to-point or may be bussed using a protocol such as Time Domain Multiple Access (TDMA). The telemetry subsystem 220 may provide connections only within a single local entity or may provide connections between sensors 212 and emitters 211 that are distributed across multiple entities that are physically dispersed.

Beamformer subsystem 230 hosts processing capabilities required to create receive (digital data reception beams 135) and transmit beams (digital data transmission beams 137). Beamformer subsystem 230 includes connections to other systems, processing nodes, interconnect channels, and software.

A connection 231 to the telemetry subsystem (connecting the beamformer subsystem 230 to the telemetry subsystem 220) provides a physical connection and protocols that allow the beamformer subsystem 230 to communicate with the sensors 212 and emitters 211 through the telemetry subsystem 220. A connection 232 to the entity's navigation system provides position, attitude, position rates, and attitude rates of the entity so that these quantities may be used by time delay computation and alignment software 236. A connection 238 to the waveform system 130 provides a connection for exchanging reception (digital data reception beams 135) and transmission beam data (digital data transmission beams 137) with the waveform system 130.

Processing nodes 233 and interconnect channels 234 collectively provide a parallel data processing capability that is sufficient to implement beamforming analysis for information reception and transmission. This beamforming analysis is accomplished by aperture location computation software 235, the time delay computation and alignment software 236, and beamforming software 237. In embodiments, DDA system 140 includes a plurality of processing nodes and interconnect channels. DDA system 140 aggregates the processing capacity of those nodes and channels to provide a cumulative capability. In another preferred embodiment, DDA system 140 includes only a single processing node having sufficient processing capacity to provide all required capabilities.

A reception beamforming process executed by the beamforming software 237 coherently sums signals received through the telemetry subsystem 220 from multiple sensors in order to create a reception beam (digital data reception beam 135) that is focused in a specific direction by temporally aligning the data and then summing the individual time domain samples. This temporal alignment is based upon the position and attitude of the platform, computed using the externally-supplied platform data.

A transmission beamformer process executed by the beamforming software 237 generates signals for transmission by multiple emitters 211 in such a way that the emission beam (digital data transmission beam 137) is focused in a specific direction by creating and temporally aligning the emitted data stream for each emitter 211. The transmission beamformer process is based upon the position and attitude of the platform (entity), computed using the externally-supplied platform data. Beamformer subsystem 230 routes the required emission signals to the appropriate emitters through telemetry subsystem 220.

Aperture location and computation software 235 computes the location of each sensor 212 and emitter 211 so that the reception and transmission temporal alignment values may be computed based upon the relative locations of the sensors 212 and emitters 211.

Figure 3A:
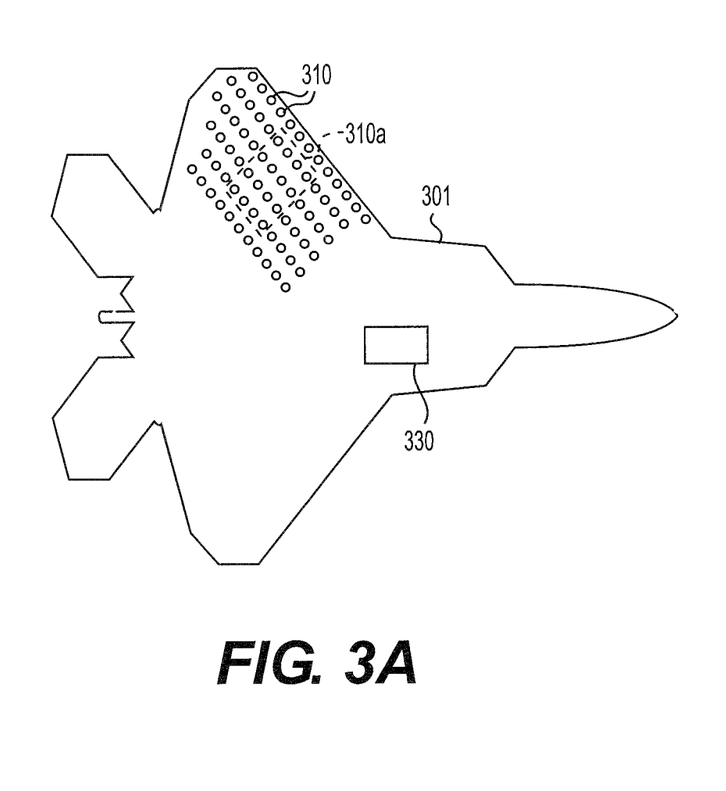
FIG. 3A is a view of an aircraft having exemplary distributed sensors and/or distributed emitters, telemetry subsystem connections, and a beamforming subsystem, an embodiment of a DDA system.
Figure 3B:
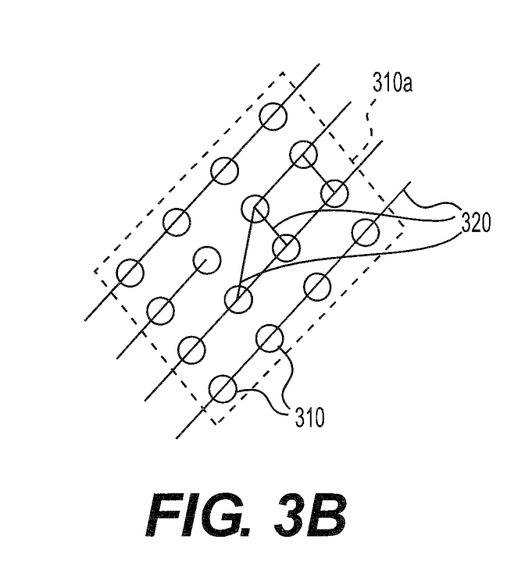
FIG. 3B is an enlarged view of the sensors and/or emitters and telemetry connections shown in FIG. 3A.

With reference now to FIG. 3A, shown is a view of an aircraft 301 having exemplary distributed sensors and/or distributed emitters, telemetry connections, and a beamforming device, of the DDA system 330 shown in FIG. 1. With reference now to FIG. 3B, shown is an enlarged view of the sensors and/or emitters and telemetry connections shown in FIG. 3A. Sensing and emitting array subsystem elements 310, previously discussed in the context of FIGS. 1 and 2 and discussed below with reference to FIGS. 4-5 (see, e.g., sensors 512 and emitters 411), are installed on the exterior surface, within the surface, or on the interior surface of an entity or platform such as the skin of the aircraft 301. The choice of installation location may be based upon the skin materials, structural analysis, and aerodynamic analysis. For example, metallic skins are opaque to most energy signals, so sensing and emitting array subsystem elements 310 would be installed on the exterior of a metallic skin. Sensing and emitting array subsystem elements 310 will be quite small and will be suitable for lying flat on the skin of the entity 301, e.g., held in place by adhesive, environmentally-suitable tape or otherwise bonded and/or affixed to the entity.

In one preferred embodiment; sensing and emitting array subsystem elements 310 (e.g., sensors 512 and emitters 411 of FIGS. 4-5) with associated telemetry connections would be pre-placed onto a strip of tape which would then be applied to the surface of an entity. In a second preferred embodiment, sensing and emitting array subsystem elements 310 (e.g., sensors 512 and emitters 411) are stenciled onto the skin of the entity 301 using a metallic paint prior to installation of the balance of the element components and telemetry components. In a third preferred embodiment, sensing and emitting array subsystem elements 310 (e.g., sensors 512 and emitters 411) and telemetry connections are embedded within the interior of a composite material skin as part of the skin fabrication process. In a fourth preferred embodiment, the antenna components (e.g., antenna 411a and 512a of FIGS. 4-5) of the sensing and emitting array subsystem elements 310 (e.g., sensors 512 and emitters 411) are installed on the exterior of the skin while the balance of the sensing and emitting array subsystem elements 310 are installed on the interior of the skin, with a microscopic hole through the skin for an electrical connection between the sensing and emitting array subsystem elements 310. In any of the above embodiments, the emitter and/or sensors may be formed on flexprint in order to conform to the entity's shape. Many other installation embodiments will be understood by a person skilled in the art of aperture design and installation and all such embodiments are envisioned by this design.

Sensing and emitting array subsystem elements 310 (e.g., sensors 512 and emitters 411) may also be installed within the interior of the entity rather than on the skin of the entity 301. Such a design is comparable to conventional radome and sonodome installations.

The installation location of sensing and emitting array subsystem elements 310 on the entity (e.g., airplane skin) will be optimized to provide the desired field of view while not compromising entity 301 characteristics such as structural efficiency, aerodynamics, or radar cross section. Certain areas of an entity, such as wing trailing edges, will be preferred in many embodiments. However, maintaining a forward field of view is important for many operational reasons so installation on the forward facing surfaces will also be preferred in other embodiments. Stabilizing surfaces and edges will also be preferred installation locations in many embodiments.

The quality of beamformer outputs will be a function of the number of sensing and emitting array subsystem elements 310 (the number of sensors 512 and emitters 411) and the total span of sensing and emitting array subsystem elements 310 across the entity. In general, a preferred embodiment will provide a span of at least 48*$\lambda$ (lambda), where $\lambda$ is the wavelength of the highest frequency of interest. In general, a preferred embodiment will provide spacing between each sensor (e.g., sensor 512) and between each emitter (e.g., emitter 411) of nominally 0.5*$\lambda$. However, the overall preferred embodiment may deviate from these general guidelines without compromising the overall design integrity.

As discussed above, FIG. 3B illustrates a local group of sensors and emitters 310a with interconnecting telemetry connections 320. As shown sensors and emitters 310 are interconnected via telemetry connections 320. In a preferred embodiment, the telemetry connections 320 confirms to the skin of the entity 301 or is embedded within the skin of the entity 301. The telemetry topology is further discussed with reference to FIG. 6 below.

Figure 4:
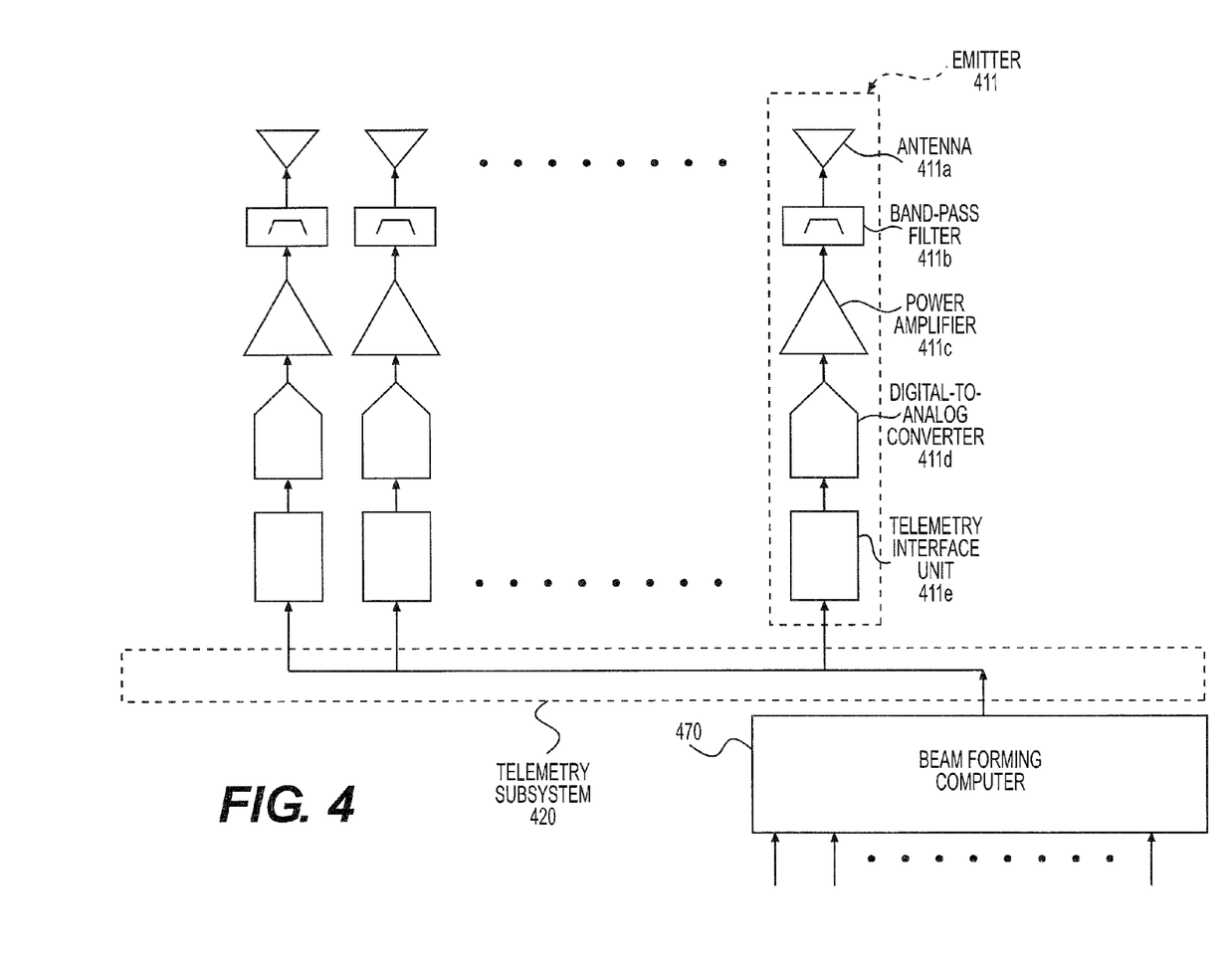
FIG. 4 is a schematic block diagram of an emitter, within an embodiment of a sensing and emitting subsystem included in an embodiment of a DDA system.

With reference now to FIG. 4, shown is a schematic block diagram of an embodiment of emitter 411 that may be included in sensing and emitting array subsystem 310 shown in FIGS. 3A-3B. A transmitting antenna (energy emitter) 411a within the emitter 411 emits energy based upon electrical signals that are initiated in beamformer subsystem 470 and are passed through telemetry subsystem 420 and telemetry interface 411e to digital-to-analog converter 411D. Antenna 411a may include a piece of small gauge wire that is tuned to the desired frequency. Alternatively, antenna 411a may be a complex circuit assembly. Alternatively, in the case of acoustic energy, antenna 411a may be a small speaker element. In any of those cases, antenna 411a receives signals from the digital-to-analog system antenna 411a and emits corresponding energy into a media.

In a preferred embodiment, the beam forming computer 470 (beamformer subsystem 230) computes transmit signals for each emitter and passes those signals through telemetry subsystem 420 to the telemetry interface unit 411e. The telemetry interface unit 411e passes the signals to the digital-to-analog converter 411d and the resulting analog signals are amplified by the power amplifier 411c. The resulting signals are band passed filtered, e.g., by band pass filter 411b, and then emitted by transmitting antenna 411a. In preferred embodiments, digital-to-analog unit 411d must be capable processing at a rate that is sufficient to generate power outputs at the highest signal of interest, e.g., for a 1 GHz frequency the sampling must be nominally 2.5 GHz.

Figure 5:
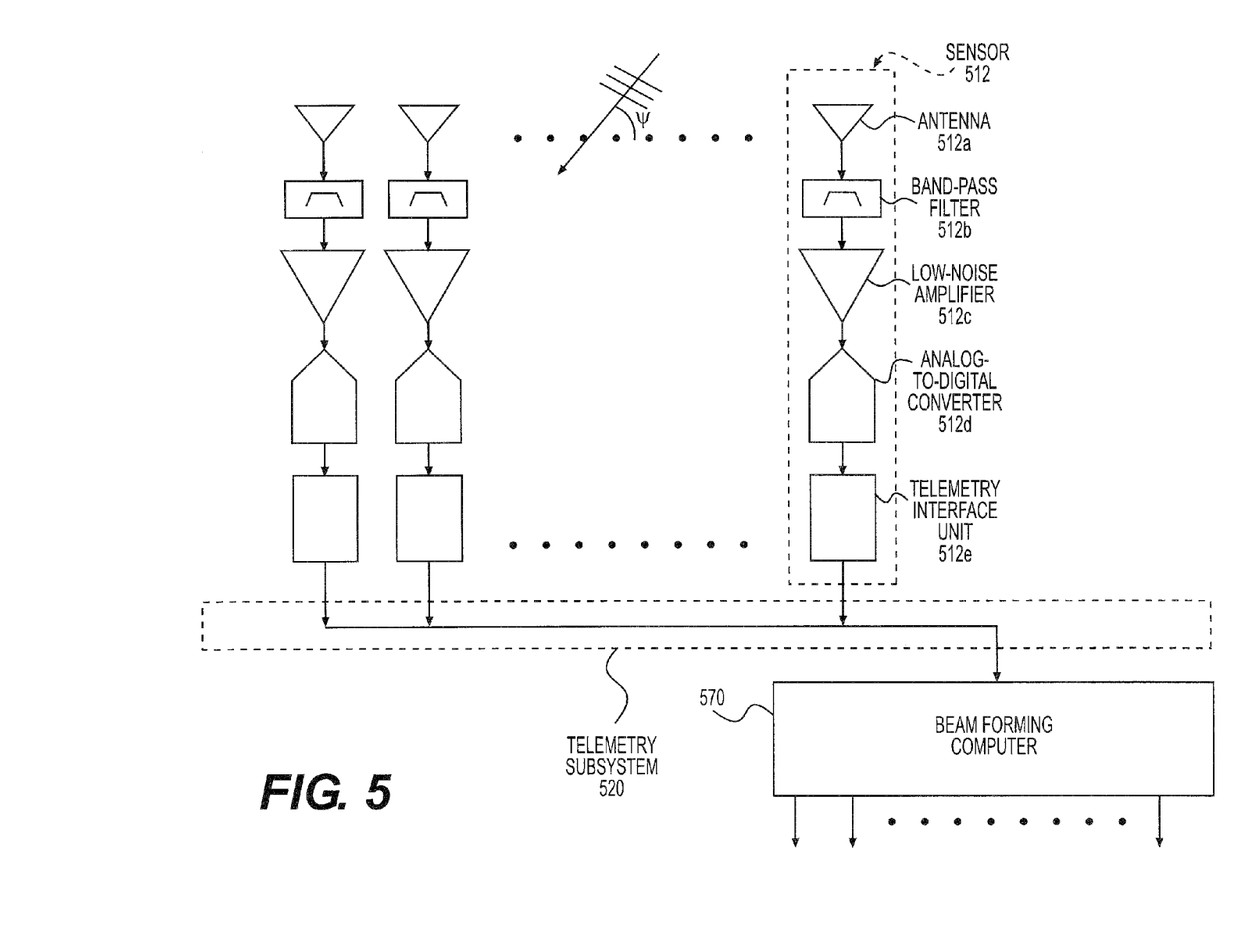
FIG. 5 is a schematic block diagram of a sensor, within an embodiment of a sensing and emitting subsystem included in an embodiment of a DDA system.

With reference now to FIG. 5, shown is a schematic block diagram of an embodiment of sensor 512 within that may be included in sensing and emitting array subsystem 310 shown in FIGS. 3A-3B. Receiving antenna (energy collector) 512a within the sensor 512 absorbs energy from the media and converts it to electrical signals. For radio frequency energy, receiving antenna 512a may include a piece of small gauge wire that is tuned to the desired frequency. Alternatively, receiving antenna 512a may be a complex circuit assembly. Alternatively, in the case of acoustic energy, receiving antenna 512a may be a small hydrophone. In any of those cases, receiving antenna 512a absorbs energy in the media and converts it to electrical energy within the sensor 512.

In a preferred embodiment, once power has been received by receiving antenna 512a the received analog signal is band-pass filtered by band-pass filter receiving antenna 512a to remove frequencies outside of the range of interest and amplified by amplifier 512c to match analog-to-digital converter 512d electrical characteristics. The analog to digital converter 512d samples the analog signal at a rate that is appropriate to the highest frequency of interest and then passes the sample data through telemetry interface unit 512e and telemetry subsystem 520 (may be same as telemetry subsystem 420 in FIG. 4) to the beamformer system 570 (beamforming computer 570, which may be same a beamforming computer 470 in FIG. 4). In a preferred embodiment, the analog-to-digital unit 512d must be capable of processing at a rate that is sufficient to perform time domain beamforming at the highest signal of interest, e.g., for a 1 GHz frequency the sampling must be nominally 10 GHz to 20 GHz.

Sensors 512 and emitters 411 require electrical power for operation. The connections required to supply such power are not illustrated in FIG. 4 or 5. In one preferred embodiment, the required power will be conveyed through a telemetry subsystem 420, 520 that is based upon fiber optics. Current technologies have demonstrated the capacity to transmit small amounts of power though fiber optics and this may be sufficient for the sensors 512 and emitters 411. In another preferred embodiment, electrical power will provided through a metallic wire to the sensors 512 and emitters 411. In a third preferred embodiment, electrical power will be conveyed by a magnetic or electrical field that surrounds the sensors 512 and emitters 411 and is converted to electrical power by the sensors 512 and emitters 411. Fiber optic and wireless power connections are a preferred embodiment because of their low impact on the host entity and their resistance to interference by the environment.

Figure 6:
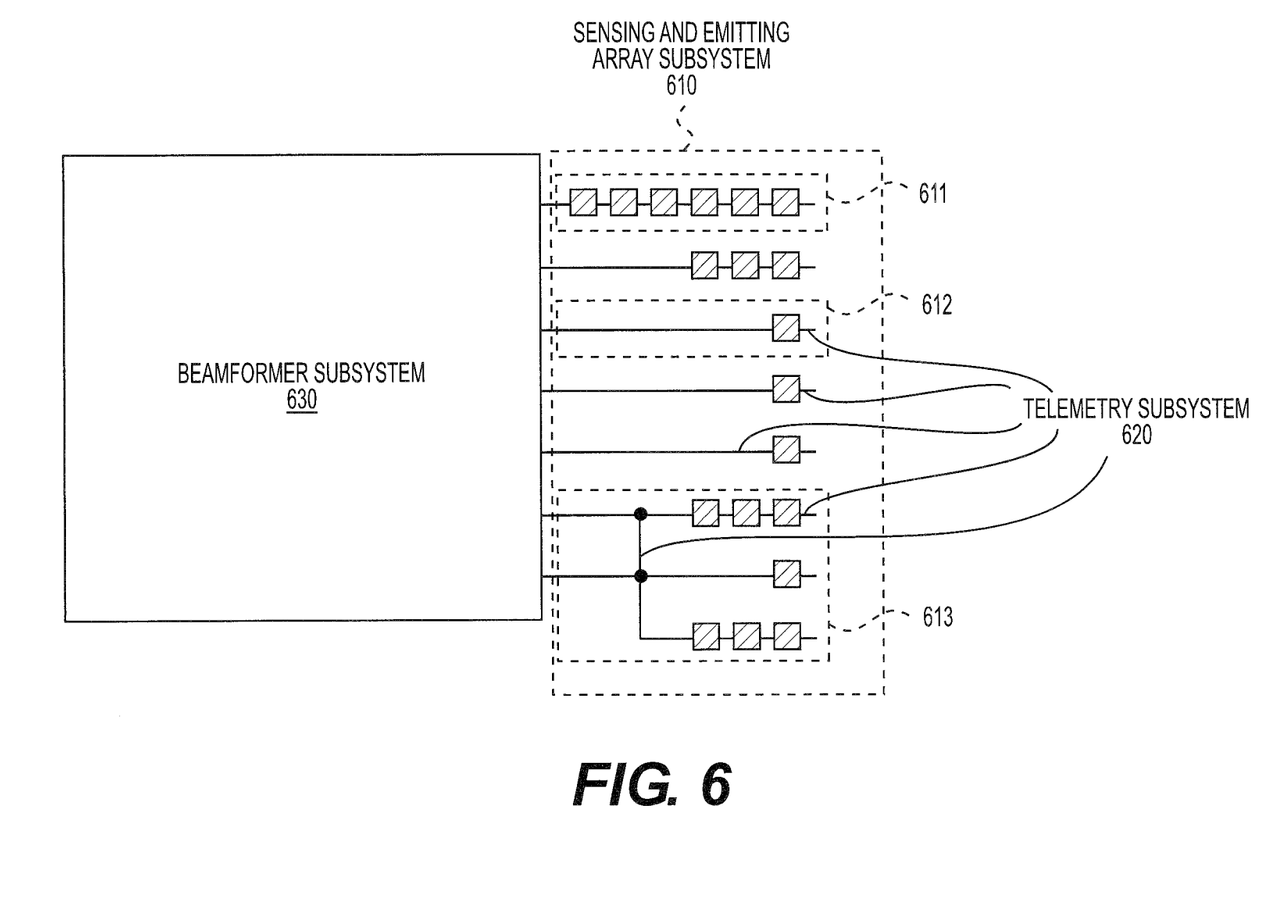
FIG. 6 is a block diagram including an embodiment of a telemetry subsystem included in an embodiment of a DDA system, illustrating point-to-point and bussed architectures.

Telemetry interface units 411e and 512e electrical and protocol capabilities required to connect a specific sensor and/or emitter to beamformer subsystem 470, 570 (e.g., beamformer subsystem 730 illustrated in FIG. 7) through telemetry subsystem 420, 520 (e.g., telemetry subsystem 620 illustrated in FIG. 6). Telemetry interface units 411e and 512e matches both the physical and protocol characteristics of telemetry subsystem 420, 520.

With reference now to FIG. 6, shown is a block diagram of an embodiment of telemetry subsystem 620 (e.g., telemetry subsystems shown in FIGS. 2-4 described above), illustrating point-to-point and bussed architectures. FIG. 6 includes beamformer subsystem 630 to illustrate that telemetry subsystem 620 connects the sensor and emitting array subsystem 610 to the beamformer subsystem 630.

In a preferred embodiment, telemetry subsystem 620 is bi-directional, conveying information for transmission from the beamformer 620 to the emitters in the sensor and emitting array subsystem 610 and received information from the sensors in the sensor and emitting array subsystem 610 to the beamformer 620. In another preferred embodiment, the telemetry system 620 is uni-directional, conveying only information for transmission or reception.

In a preferred embodiment the physical telemetry architecture may be point-to-point, bussed, or bussed with junction points. In a point-to-point configuration 612 each sensor or emitter is directly tied through the telemetry subsystem 620 to a port on the beamformer subsystem 630. This provides the simplest design, and potentially maximizes total telemetry throughput, but requires the greatest number of input ports on the beamformer subsystem 630. In a bussed configuration 611 a set of sensors and emitters are connected to a single beamformer subsystem 630 port. The data from the sensors and emitters is multiplexed onto a single telemetry line using a protocol such as TDMA or CDMA. In a bussed with junction points configuration 613 the telemetry lines may interconnect outside of the beamformer subsystem 630. This requires the fewest input ports on the beamformer subsystem 630 but requires a more complex protocol and may create throughput system limitations.

In a preferred embodiment the telemetry subsystem 620 may be physically implemented as fiber carrying optical signals, as metallic wires carrying electrical signals, or as wireless signals. Fiber optic connections offer the highest data rate and are impervious to electrical interference. However, fiber cannot easily convey electrical power to the sensors and emitters. Metallic wire may be preferred for this or other reasons. Wireless connections impose the least impact on the entity but may be undesirable due to the potential for information security or RF interference.

The sensors and emitters in the sensor and emitting array subsystem 610 require electrical power for operation and the electrical power distribution is an element of the telemetry subsystem 620. In a preferred embodiment, the telemetry subsystem 620 will comprise fiber optic interconnects and power will be sufficiently available through the fiber. This emerging power-through-fiber technology may provide inadequate power capacity. In this case, a preferred embodiment will require an alternative power distribution system, such as a network of metallic wiring.

In a preferred embodiment the telemetry subsystem 620 will exist solely within the form of the entity. In an alternative embodiment, the telemetry subsystem 620 will bridge between two or more entities to provide overall DDA capabilities that utilize the sensors and emitters on each entity. Such cooperative processing requires accurate timing and positional synchronization between the cooperating entities but such cooperation is increasingly within the capability of the known state of the art.

Figure 7:
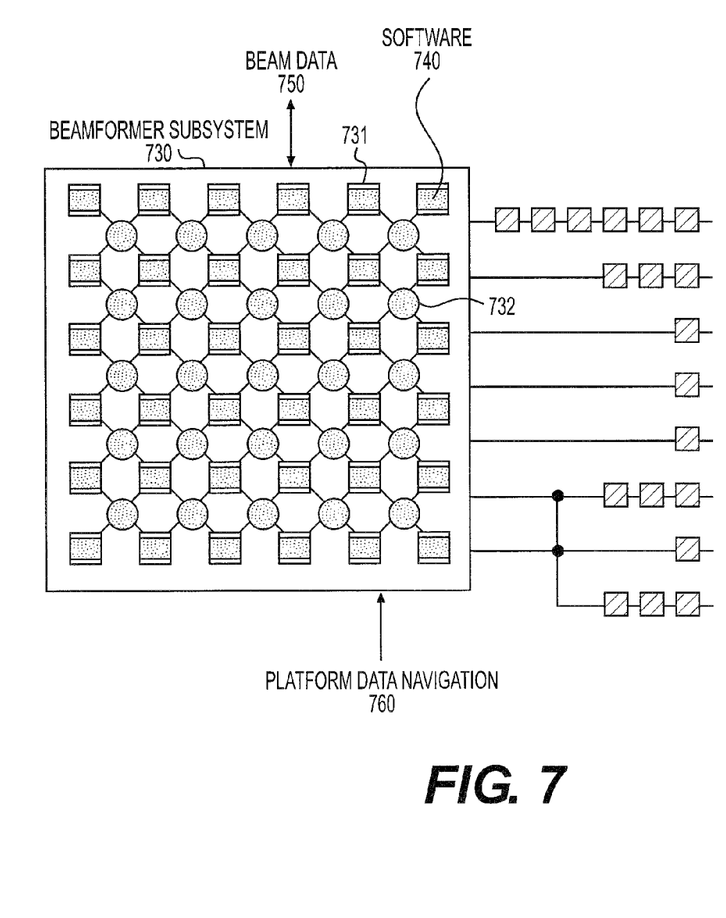
FIG. 7 is a block diagram including an embodiment of a beamformer subsystem included in an embodiment of a DDA system, illustrating processing nodes exchanging data through interconnect channels. Allocation of functionality (i.e., processing to the processing nodes) is also depicted.

With reference now to FIG. 7, shown is a block diagram of an embodiment of beamformer subsystem 730 (e.g., beamformer subsystems shown in FIGS. 2-4 and 6 described above), illustrating processing nodes exchanging data through interconnect channels. Allocation of functionality (i.e., software 740 to the processing nodes) is also depicted. Beamformer subsystem 730 includes processor nodes 731 that execute processor software 740. The processor nodes 731 communicate via an interconnect mesh that is implemented using router nodes 732. In a preferred embodiment the processor nodes 731, routers 732, and interconnect mesh are implemented on a single electronic chip. Multiple chips are then interconnected to create a processor array of sufficient processing capacity.

In a preferred embodiment, congruence is established between processors 731 and the sensors and emitters. One or more processors 731 are loaded with the received data from a sensor through the telemetry subsystem 620 and use that data to perform the calculations required to create directional reception beams of data at the appropriate beamformer subsystem 730 output rates. In addition, one or more processors are assigned the task of creating ready-for-transmit data that will be transmitted to a specific emitter through the telemetry subsystem 620.

In a preferred embodiment the processor software, as distributed across the beamformer subsystem 730 array of processor nodes 731, provides the capability to compute received beams data 750 based upon the sensor data that is stored within the beamformer processors 731. Each such received beam comprises the sampled data from the omnidirectional sensors that has been computationally transformed in a manner such that it corresponds to the sampled data that would have been received from a directional antenna that is pointed and stabilized in a specified direction.

In a preferred embodiment, the processor software 740, as distributed across the beamformer subsystem 730 array of processor nodes 731, also provides the capability to compute data that is ready for emission based upon transmit beam data 750 that is received from the waveform system (see FIG. 1 above). The transmit beam data is computationally transformed to compute the equivalent signals that must be emitted by the individual emitters in order to create energy in the media that corresponds in power and direction of the transmit beam data.

The receive and transmit beam data 750 is created by the beamforming software 740 that executes on the processors 731. Such capabilities are well understood by persons familiar with the art of digital signal processing. The beamforming software 740 has three principal functions. First, beamforming software 740 receives platform navigation data 760 and uses that data to compute the relative position of all sensors and emitters across the entity. Second, beamforming software 740 uses the sensor and emitter positions to compute the corresponding time delays that are needed for temporal alignment when creating receive or transmit beams. Third, beamforming software 740 applies the time delays to the received sensor data to create reception beams and to the transmission beam data to create data for the emitters.

Figure 8:
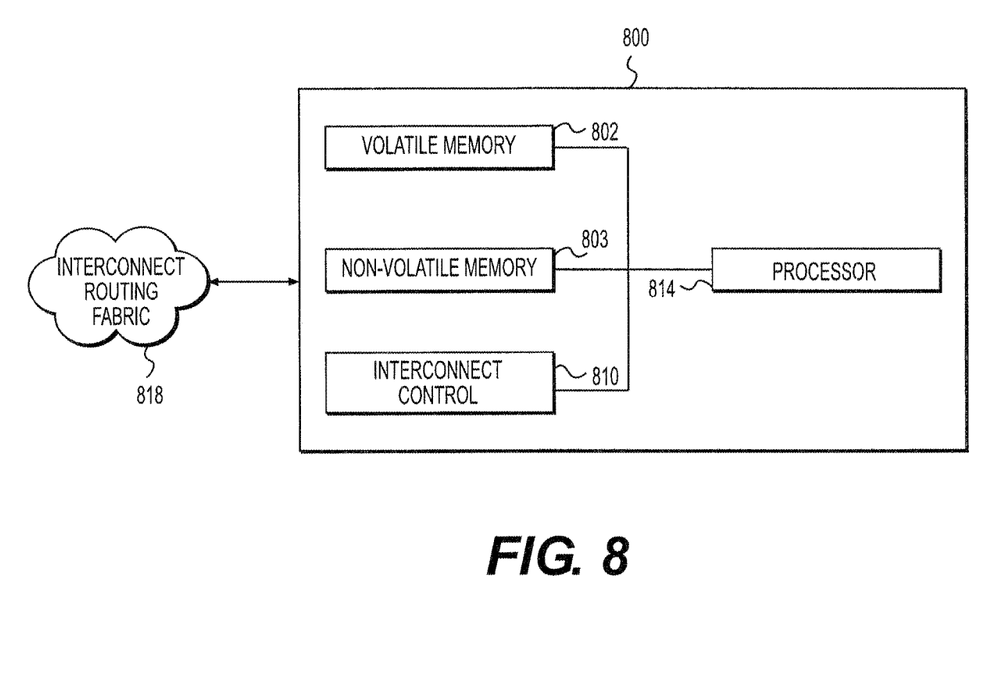
FIG. 8 illustrates exemplary hardware components of a processing node an embodiment of a beamformer subsystem included in an embodiment of a DDA system that may be used in connection with the method for providing a DDA system for sensing or emitting energy.

With reference now to FIG. 8, shown is a block diagram illustrating exemplary hardware components of a processing node 800 within the beamformer subsystem 730 that may be used in connection with the method for providing a DDA system for sensing or emitting energy. The processing node 800 includes a processor 814 that is capable of executing the beamforming software 740. The processing node 800 also includes non-volatile memory 803 for storing the software 740, volatile memory 802 for storing intermediate results during software 740 execution, and interconnect control 810 for maintaining connections with other processor nodes through the interconnect routing fabric 818. In a preferred embodiment, the memory 802, 803, processor 814, and interconnect control 810 are implemented as areas within a gate array processor and are replicated within the gate array to provide a plurality of processor nodes.

The DDA systems and methods described throughout this disclosure may implement additional exemplary hardware components. For example, the processing node 800, or other computer system similarly configured, may include and execute one or more subsystem components to perform functions described herein, including steps of methods described above. Likewise, a mobile device which includes some of the same components of processing node 800 may run an application and perform steps of methods described above. Processing node 800 may connect with a network, e.g., Internet, or other network, to receive inquires, obtain data, and transmit information.

Processing node 800 may also include a secondary storage device. Processing node 800 may also include a plurality of processors and be configured as a plurality of, e.g., bladed servers, or other known server configurations. Processing node 800 may also include an input device, a display device, and an output device. Volatile memory 802 may include RAM or similar types of memory, and may store one or more applications for execution by processor 814. Non-volatile memory 803 or secondary storage device may include a hard disk drive, floppy disk drive, CD-ROM drive, or other types of non-volatile data storage. Processor 814 executes the application(s), such as subsystem components, which are stored in Volatile memory 802, Non-volatile memory 803, or secondary storage, or received from the Internet or other network. The processing by processor 814 may be implemented in software, such as software modules, for execution by computers or other machines. These applications preferably include instructions executable to perform the system and subsystem component (or application) functions and methods described above and illustrated in the drawings herein. The applications preferably provide graphical user interfaces (GUIs) through which users may view and interact with subsystem components (or application in mobile device).

Processing node 800 may store one or more database structures in non-volatile memory 803 or secondary storage 404, for example, for storing and maintaining databases, and other information necessary to perform the above-described methods. Alternatively, such databases may be in storage devices separate from subsystem components.

Also, as noted, processor 814 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system (or application).

Input device may include any device for entering information into processing node 800, such as a touch-screen, keyboard, mouse, cursor-control device, touch-screen, microphone, digital camera, video recorder or camcorder. The input device may be used to enter information into GUIs during performance of the methods described above. The display device may include any type of device for presenting visual information such as, for example, a computer monitor or flat-screen display (or mobile device screen). The display device may display the GUIs and/or output from sub-system components (or application). Output device may include any type of device for presenting a hard copy of information, such as a printer, and other types of output devices include speakers or any device for providing information in audio form.

Examples of processing node 800 include dedicated server computers, such as bladed servers, personal computers, laptop computers, notebook computers, palm top computers, network computers, mobile devices, or any processor-controlled device capable of executing a web browser or other type of application for interacting with the system.

Although only one processing node 800 is shown in detail, the system may use multiple computer system or servers as necessary or desired to support the users and may also use back-up or redundant servers to prevent network downtime in the event of a failure of a particular server. In addition, although processing node 800 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling a computer system, processing node 800, to perform a particular method, such as methods described above.

Any of the embodiments described above may incorporate the DDA system/method in an entity such as an aircraft, ship, ground vehicle, or fixed installation.

The contemplated modifications and variations specifically mentioned above and below are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A distributed directional aperture system for receiving and transmitting signals in one or more frequency bands, comprising:
   a sensor and emitter array subsystem that includes a plurality of sensors and emitters arranged in an array distributed across a platform, wherein the sensors sense energy in a media adjacent the platform and generate sensor signals and the emitters emit signals based on processing of the sensor signals by the system;
   a telemetry subsystem that connects the array of distributed sensors and emitters and conveys sensor signals and emitter signals received from or sent to the sensor and emitter array subsystem; and
   a beamformer subsystem that processes the sensor signals and emitter signals to synthesize directional reception channels and processes transmission channels to synthesize telemetry data that is emitted by the emitters, wherein the beamformer subsystem is configured to:
      determine the relative positions of the plurality of sensors and emitters based on navigation data pertaining to the platform;
      determine at least one time delay corresponding to each of the plurality of sensors and emitters based on the relative positions; and
      apply the respective time delays to the corresponding sensor signals to generate reception beams and to the data streams of the corresponding emitters to generate transmission beams.

2. The system of claim 1 that is optimized for performance with respect to a single domain within the family of communications, electronic warfare, electronic intercept, and radar.

3. The system of claim 1 that is optimized for performance when used concurrently by one or more domains within the family of communications, electronic warfare, electronic intercept, and radar.

4. The system of claim 1 that incorporates a cognitive, adaptive process to optimize sensor and emitter selection and signal processing when used concurrently by one or more domains within the family of communications, electronic warfare, electronic intercept, and radar.

5. The system of claim 1 wherein the platform is a single entity and the sensors and emitters are distributed across an exterior surface of the single entity.

6. The system of claim 1 wherein the platform comprises a plurality of entities and the sensors and emitters are distributed across exterior surfaces of the plurality of entities.

7. The system of claim 5 wherein the platform is an aircraft, ship, ground vehicle, or fixed installation.

8. The system of claim 1 wherein each of the sensors and emitters comprises an energy collector, an energy emitter, and conversion circuitry.

9. The system of claim 8 wherein the energy collector comprises a fine wire, flexprint or stenciled conductive material.

10. The system of claim 1 wherein one or more of the sensors and emitters are embedded within an exterior surface of at least one entity comprising the platform.

11. The system of claim 1 wherein one or more of the sensors and emitters are located in an interior of at least one entity comprising the platform.

12. The system of claim 1 wherein the navigation data comprises position and attitude of the platform.

13. The system of claim 8 wherein each of the sensors and emitters further comprises an optical interface to the telemetry sub system.

14. The system of claim 1 wherein the array of sensors and emitters is arranged to facilitate directional processing in substantially all azimuths and elevations.

15. The system of claim 1 wherein the sensor and emitter array subsystem is configured to collect energy from a singled desired radiated frequency band.

16. The system of claim 1 wherein the sensor and emitter array subsystem is configured to collect energy from a plurality of desired radiated frequency bands and at a specific polarization.

17. The system of claim 1 wherein the sensors and emitters are powered through an electrical power distribution network that is distinct from the telemetry subsystem.

18. The system of claim 1 wherein the telemetry subsystem conveys digital signal samples between the sensors and emitters and the beamformer subsystem.

19. The system of claim 12 wherein the navigation data further comprises position rate and attitude rate of the platform.

20. The system of claim 1 wherein each of at least a portion of the plurality of sensors and emitters is connected to the beamformer subsystem by a non-multiplexed telemetry line within the telemetry subsystem.

21. The system of claim 1 wherein multiple ones of the plurality of sensors and emitters are connected to the beamformer subsystem by a multiplexed telemetry line within the telemetry subsystem.

22. The system of claim 21 wherein the multiplexing is performed using time division multiple access (TDMA) or code division multiple access (CDMA).

23. The system of claim 1 wherein the beamformer subsystem processes received data from the sensors and emitters in order to synthesize one or more directional received beams at full radiated frequency.

24. The system of claim 1 further comprising one or more waveform systems wherein the beamformer subsystem processes waveform data from the one or more waveform systems in order to generate telemetry data that will create transmitted beams.

25. The system of claim 1 wherein the beamformer subsystem connects to a single telemetry connection within the telemetry subsystem.

26. The system of claim 1 wherein the beamformer subsystem connects to multiple telemetry connections within the telemetry subsystem.

27. The system of claim 1 wherein the beamformer subsystem comprises an array of interconnected processor nodes with the capability of re-assigning processor node tasks in order to tune the beamforming process to specific mission needs.

28. The system of claim 1 wherein the beamformer subsystem analyzes data from a single epoch of time chosen from a plurality of epochs of time.

29. The system of claim 1 wherein the beamformer subsystem analyzes data from multiple epochs of time, creating a temporal synthetic aperture.

30. The system of claim 1 wherein the beamformer subsystem is further configured to generate one or more of the reception beams and transmission beams based on a planar wavefront model, in order to focus the one or more beams at an infinite range from the sensors and emitters.

31. The system of claim 1 wherein the beamformer subsystem is further configured to generate one or more of the reception beams and transmission beams based on a curved wavefront model, in order to focus the one or more beams at a specific range from the sensors and emitters.

32. The system of claim 1 wherein the beamformer subsystem is further configured to generate the reception and transmission beams dynamically by selecting and weighting the sensors and emitters in order to improve the performance with respect to one or more of the following: specific receivers and transmitters, external systems attempting to interfere with the system, or external systems attempting to intercept the system data.

33. The system of claim 1 wherein the beamformer subsystem is further configured to generate the reception and transmission beams dynamically by selecting and weighting the sensors and emitters in order to mitigate interference between the sensors and emitters comprising the array subsystem.

34. The system of claim 1 wherein the beamformer subsystem is further configured to generate the reception and transmission beams dynamically by selecting and weighting the sensors and emitters in order to improve performance across multiple mission areas, including communications, electronic intercept, defensive electronic warfare, offensive electronic warfare, and combinations thereof.

\* \* \* \* \*